March 15, 1960 W. J. VAN DER GRINTEN ET AL 2,928,890
SOLID ELECTROLYTE CELLS AND BATTERIES
Filed Dec. 16, 1955
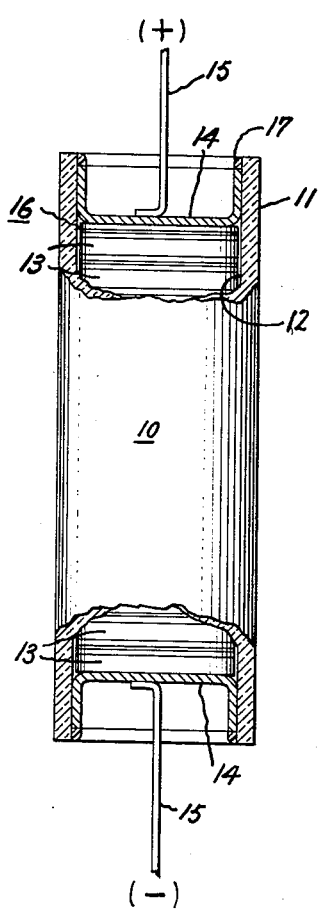
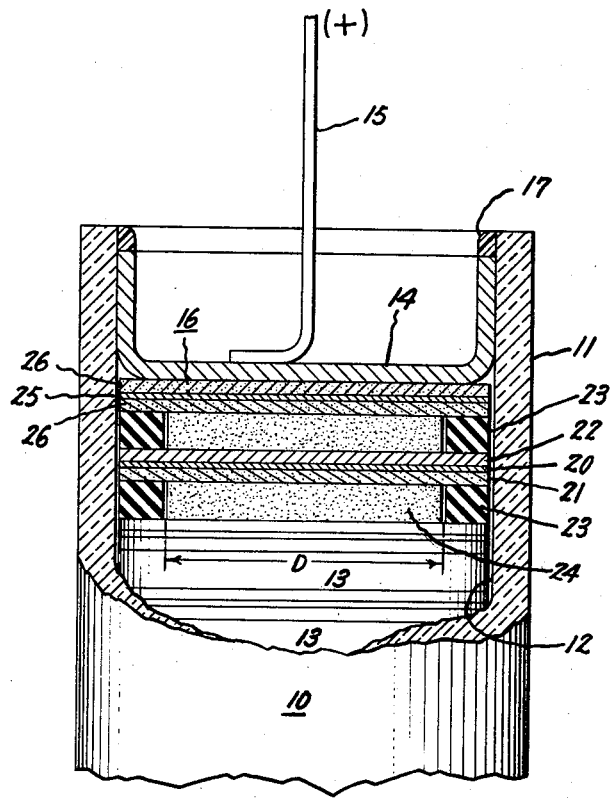
Inventors:
Willem J. van der Grinten,
Donald Mohler,
by Paul A. Frank
Their Attorney.

United States Patent Office 2,928,890
Patented Mar. 15, 1960

2,928,890

SOLID ELECTROLYTE CELLS AND BATTERIES

Willem J. van der Grinten, De Witt, and Donald Mohler, Saratoga Springs, N.Y., assignors to General Electric Company, a corporation of New York Application December 16, 1955, Serial No. 553,460

7 Claims. (Cl. 136—83)

This invention relates to batteries and specifically to cells and batteries which contain solid components.

A compact, leak-proof battery which has a long shelf life is desirable as a low current power source for transistors, radiation meters, amplifiers, image tubes, exposure meters, and for charging capacitors. While a battery with solid components is desirable to meet space and leakage requirements, a miniature construction is subject to internal short circuiting under both normal and abnormal conditions. Our invention is concerned with a miniature battery having solid components, which maintains a high voltage under the above operating conditions.

Accordingly, it is an object of our invention to provide an improved cell with solid components.

It is another object of the invention to provide a multiple cell battery which may consist of any number of solid cells to give the desired voltage and capacity.

It is another object of the invention to provide a multiple cell battery which reduces internal short circuiting.

It is a further object of the invention to provide a miniature solid electrolyte-type battery with a relatively long shelf life as well as an active life.

In carrying out our invention in one form, a plurality of solid cells are arranged in stacked relationship within an insulating casing to provide a multiple cell battery. Each solid battery cell has a solid metallic anode, an impervious, electrically conductive layer on one surface of the anode, at least one solid electrolyte positioned on the other anode surface, an insulating washer on the electrolyte, and a cathode on the electrolyte within the insulating washer.

These and various other objects, features and advantages of the invention will be better understood from the following description taken in connection with the accompanying drawing in which:

Fig. 1 is a partial sectional view of a multiple cell battery which embodies our invention; and Fig. 2 is an enlarged sectional view of a portion of the battery which is shown in Fig. 1.

In Fig. 1 of the drawing, a multiple cell battery, which is indicated generally at 10, comprises a casing 11 to define a chamber 12 in which a plurality of individual solid cells 13 are stacked between opposed terminal electrodes 14 with terminal leads 15. Casing 11 may be composed of a suitable insulating material, such as plastic, glass or ceramic. An impervious, electrically conductive end disk 16 is positioned between uppermost cell 13 and its associated terminal electrode 14 to prevent solid contact and chemical action between the cell cathode and this electrode. Each electrode 14 is held in position by a seal 17 around its outer periphery to provide a closed structure.

In Fig. 2, a series of cells 13 are shown stacked within casing 11 of battery 10. Each cell 13 is provided with a solid metallic anode 20 which has an impervious, electrically conductive layer 21 on its lower surface and a solid electrolyte 22 in contact with its upper surface. An insulating and containing washer or ring 23 is positioned on the upper surface of electrolyte 22 around its periphery to contain a cathode 24 which can be in a permeable solid or powdered form. Anode 20 is preferably a wafer-like layer or foil of a suitable metal, such as silver or lead. We have found that a solid silver or lead halide which is chemically compatible with anode 20 can be utilized to replace the aqueous electrolyte of a conventional battery. If a plurality of these electrolytes is used in individual cell construction, adjacent electrolytes must also be chemically compatible. While cathode 24 can be a permeable solid material, we prefer to employ a compressed powdered material which should be capable of producing a low pressure reacting gas with anode 20 to form an additional solid electrolyte layer during operation of battery 10. Suitable cathodes are produced by a mixture of a finely divided electrically conductive electron donor material, such as carbon powder or tantalum powder chemically compatible with a halide, hypochlorite, or a combination thereof which exhibits a minimum pressure of $10^{-6}$ millimeters of Hg. Examples of suitable cathodic materials are cupric chloride ($CuCl_2 \cdot 2H_2O$) and carbon, cupric bromide ($CuBr_2$) and carbon, ferric chloride ($FeCl_3$) and carbon, and calcium hypochlorite ($Ca(OCl)_2$) and carbon. Washer 23 maintains conductive layer 21, anode 20 and electrolyte 22 of each cell 13 in space relationship with similar layers in adjacent cells to improve battery operation through reduction of internal short circuiting. When a powdered cathodic material is employed, washer 23 is preferably fastened to electrolyte 22 or layer 21 to prevent spread of this material which can result in a short circuit.

An electrically conductive end disk 16 which is positioned between uppermost cell 13 and its terminal electrode 14 comprises a metallic layer 25 with a coating of impervious, electrically conductive material 26 on both surfaces. Disk 16 protects electrode 14 from adverse chemical effects of cathode 24. If it is desired, disk 16 can be eliminated when electrode 14 consists of a stable metal, such as tantalum. Each electrode 14 which fits against stacked cells 13 within casing 11 has a seal 17 around its periphery to close battery 10. We have found that seal 17 can be made of adhesive material, cement or metal. A terminal lead 15 is affixed to each electrode 14 in any suitable manner.

In one method of constructing a multiple cell battery in accordance with our invention, a solid metallic anode sheet is thoroughly cleaned, folded in a manner to provide a hermetically sealed structure, and then heated in a halide gas atmosphere in an electric oven to produce a metallic halide electrolyte on only one surface of the sheet. If it is desired to produce a plurality of electrolyte layers, the anode sheet may be exposed to a series of different halide vapors. An impervious, electrically conductive layer 21 is then applied to the uncoated surface of the anode sheet to form a protective layer for the anodic material. The coated sheet is then punched out to provide a plurality of disks which form a portion of individual cells 13. An insulating and containing washer 23 is fastened on the surface of electrolyte 22 around its periphery. A powdered cathodic material is placed and compressed on the surface of electrolyte 22 within washer 23 with a masking templet and piston. While cathode 24 can fill the entire volume within washer 23, it is desirable to space the cathode from the inner wall of the washer to avoid damaging battery 10 during assembly.

One terminal electrode 14 is inserted within casing 11 adjacent its end to form a closure for one end of aperture 12. This terminal electrode is then held in place by a seal 17 around its periphery. A plurality of individual cells 13 are fitted in stacked relationship within casing 11 to give the desired voltage and capacity for the battery. After uppermost cell 13 has been inserted, an impervious, electrically conductive end disk 16 is placed on this cell. A second terminal electrode 14 is then inserted within the open end of casing 11 to close battery 10. If a stable metallic electrode, such as tantalum is employed, disk 16 can be eliminated. A compressive force is applied against the outer surface of second terminal electrode 14 to position cells 13 snugly within casing 11 and to insure adequate mechanical stability of the battery. While cells 13 are under compression, a seal 17 is applied around the periphery of this terminal electrode to completely close the structure. Terminal leads 15 can be affixed to electrodes 14 before or during assembly of battery 10.

As an example of the present invention, a 43 solid cell battery was constructed which had an active cell diameter D of about 250 mils. Each cell comprised a 1½ mils thick conductive layer, a ½ mil thick silver anode, a 1½ mils thick silver bromide electrolyte, and a 3½ mils thick cupric bromide and carbon cathode. A 3½ mils thick insulating washer of Teflon was mounted on the electrolyte and surrounded the compressed powdered cathode which was spaced from its inner wall. This battery gave an open circuit voltage of about 31.0 volts and a short circuit current of about 0.6 milliampere per square inch of cell area at room temperature.

A cell which was built in accordance with this invention had an active cell diameter D of about 375 mils. This solid cell had a ¾ mil thick silver anode, a 1 mil thick silver chloride electrolyte, and approximately a 40 mil thick powdered calcium hypochlorite and carbon cathode. A glass tube was positioned around the powdered cathode. This cell gave an open circuit voltage of 0.9 to 1.0 volt and a short circuit current of about 0.03 milliampere per square inch of cell at room temperature.

As a further example of the present invention, a cell was constructed which had an active cell diameter D of about 375 mils. This cell comprised a 1 mil thick lead anode, a 40 mils thick powdered lead fluoride electrolyte, and 50 mils thick powdered argentic fluoride and carbon cathode. A glass tube surrounded the cathode. This cell gave an open circuit voltage of about 1.8 to 1.9 volts.

As will be apparent to those skilled in the art, the objects of our invention are attained by the use of a plurality of solid cells which are arranged in stacked relationship within an insulating casing to provide a multiple cell battery.

While other modifications of this invention and variations of structure which may be employed within the scope of the invention have not been described, the invention is intended to include all such as may be embraced within the following claims.

What we claim as new and desire to secure by Letters Patent of the United States is:

1. A solid cell comprising a solid metallic anode, at least one solid metallic halide electrolyte positioned on said anode, an insulating washer mounted on said electrolyte, said anode, solid electrolyte and insulating washer being arranged in a stacked array in the order mentioned, and a low pressure reacting gas-producing compressed powdered cathode on said electrolyte within said insulating washer, said cathode comprising porous mixture of a metallic halide and an electrically conductive electron donor material chemically nonreactive with the remainder of the mixture.

2. A solid cell comprising a solid metallic anode, at least one solid metallic halide electrolyte positioned on said anode, an insulating annular washer mounted on said electrolyte, the outer edge of said washer being coincident with the marginal edge of said electrolyte and the inner edge of said washer being inwardly spaced from the marginal edge of said electrolyte, said anode, solid electrolyte and insulating washer being arranged in a stacked array in the order mentioned, and a compressed powdered cathode comprising a mixture of calcium hypochlorite and an electron donor material positioned on said electrolyte within said insulating washer.

3. A multiple cell battery comprising an insulating casing, a plurality of solid cells arranged in stacked relationship within said casing, said cells being connected in electrical series circuit relationship, each of said solid cells comprising a solid metallic anode, an impervious, electrically conductive layer on one surface of said anode, at least one solid electrolyte positioned on the other surface of said anode, an insulating annular washer mounted on said electrolyte, the outer edge of said washer being coincident with the marginal edge of said electrolyte and the inner edge of said washer being inwardly spaced from the marginal edge of said electrolyte, said anode, solid electrolyte and insulating washer being arranged in a stacked array in the order mentioned, a cathode positioned on said electrolyte within said insulating washer, whereby said washer confines said cathode and prevents spreading thereof around the marginal edges of said electrolyte to said anode, and terminal means on said casing to provide electrical connection to said series connected cells.

4. A multiple cell battery comprising an insulating casing, a plurality of solid cells arranged in stacked relationship within said casing, said cells being connected in electrical series circuit relationship, each of said solid cells comprising a solid metallic anode, an impervious, electrically conductive layer on one surface of said anode, at least one solid metallic halide electrolyte positioned on said anode, an insulating annular washer fastened to the surface of said electrolyte, the outer edge of said washer being coincident with the marginal edge of said electrolyte and the inner edge of said washer being inwardly spaced from the marginal edge of said electrolyte, said anode, solid electrolyte and insulating washer being arranged in a stacked array in the order mentioned, a compressed powdered cathode comprising a mixture of a metallic halide and an electron donor material selected from the class consisting of carbon and tantalum positioned on said electrolyte within said insulating washer, and terminal means on said casing to provide electrical connection to said series connected cells.

5. A multiple cell battery comprising an insulating casing, a plurality of solid cells arranged in stacked relationship within said casing, said cells being connected in electrical series circuit relationship, each of said solid cells comprising a solid metallic anode, an impervious, electrically conductive layer on one surface of said anode, at least one solid metallic halide electrolyte positioned on said anode, an insulating washer fastened to the surface of said electrolyte, the outer edge of said washer being coincident with the marginal edge of sad electrolyte and the inner edge of said washer being inwardly spaced from the marginal edge of said electrolyte, said anode, solid electrolyte and insulating washer being arranged in a stacked array in the order mentioned, a compressed powdered cathode comprising a mixture of a low pressure reacting gas-producing material and a porous electrically conductive electron donor material nonreactive with the remainder of the mixture positioned on said electrolyte within said insulating washer, and terminal means on said casing to provide electrical connection to said series connected cells.

6. A multiple cell battery comprising an insulating casing, a plurality of solid cells arranged in stacked relationship within said casing, said cells being connected in electrical series circuit relationship, each of said solid cells comprising a solid silver anode, an impervious, electrically conductive layer on one surface of said anode, at least one solid electrolyte comprising silver bromide positioned on said anode, an insulating annular washer fastened to the surface of said electrolyte, the outer edge of said washer being coincident with the marginal edge of said electrolyte and the inner edge of said washer being inwardly spaced from the marginal edge of said electrolyte, said anode, solid electrolyte and insulating washer being arranged in a stacked array in the order mentioned, a compressed powdered cathode comprising a mixture of cupric bromide and carbon positioned on said electrolyte within said insulating washer, said cathode being spaced from the inner wall of said washer, and terminal means on said casing to provide electrical connection to said series connected cells.

7. A solid cell comprising a wafer-like solid metallic anode, a layer of solid metallic halide electrolyte in contact with and coextensive with one face of said anode, an electrically insulating annular washer contacting the face of said electrolyte opposite from said anode to form an annular wall outstanding from said electrolyte face, said washer having an outer edge coincident with the marginal edge of the electrolyte and an inner edge inwardly spaced from the marginal edge of the electrolyte, and a low pressure reacting gas-producing cathode positioned in contact with said electrolyte within said insulating washer, whereby said cathode is retained by said annular wall and prevented from spreading into contact with said anode.

References Cited in the file of this patent

UNITED STATES PATENTS

| | | |
|---|---|---|
| 2,594,879 | Davis | Apr. 29, 1952 |
| 2,689,876 | Lehovec | Sept. 21, 1954 |
| 2,690,465 | Broder | Sept. 28, 1954 |
| 2,707,199 | Ruben | Apr. 26, 1955 |
| 2,778,754 | Shorr | Jan. 22, 1957 |
| 2,793,244 | Van der Grinten | May 21, 1957 |